United States Patent
Lyle

(10) Patent No.: US 10,437,826 B2
(45) Date of Patent: *Oct. 8, 2019

(54) DATA ACCESS PERFORMANCE USING DECOMPRESSION MAPS

(71) Applicant: International Business Machines Corporation, Armonk, NY (US)

(72) Inventor: Robert W. Lyle, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/604,210

(22) Filed: May 24, 2017

(65) Prior Publication Data

US 2017/0255678 A1  Sep. 7, 2017

Related U.S. Application Data

(63) Continuation of application No. 14/032,122, filed on Sep. 19, 2013, now Pat. No. 9,753,983.

(51) Int. Cl.
*G06F 16/2455* (2019.01)
*G06F 16/245* (2019.01)
(Continued)

(52) U.S. Cl.
CPC .... *G06F 16/24561* (2019.01); *G06F 16/1744* (2019.01); *G06F 16/2365* (2019.01); *G06F 16/245* (2019.01)

(58) Field of Classification Search
CPC ......... G06F 17/30501; G06F 17/30153; G06F 16/2451; G06F 16/245; G06F 16/1744; G06F 16/2365
(Continued)

(56) References Cited

U.S. PATENT DOCUMENTS 5,442,350 A   8/1995  Iyer et al.
6,170,047 B1  1/2001  Dye
(Continued)

FOREIGN PATENT DOCUMENTS

| CN | 1770150 A    | 5/2006 |
| CN | 1904882 A    | 1/2007 |
| CN | 102917020 B  | 2/2013 |

OTHER PUBLICATIONS

Abadi, Daniel J. et al. "Integrating compression and execution in column-oriented database systems." SIG MOD 2006, Jun. 27-29, 2006, Chicago, Illinois, USA. 12 pp.
(Continued)

*Primary Examiner* — Jay A Morrison
*Assistant Examiner* — Ken Hoang
(74) *Attorney, Agent, or Firm* — Mollborn Patents, Inc.; Fredrik Mollborn

(57) ABSTRACT

Techniques for decompressing data in a database system. A query is received, which pertains to a subset of data within a compressed set of data. One or more decompression strategies are evaluated using a cost model. The cost model includes an estimated filter factor. A low cost decompression strategy is selected based on the results of the evaluation of the one or more decompression strategies. One or more bytes representing the requested subset of data are located within the compressed set of data. Only a portion of the compressed data that corresponds to the subset of data is decompressed, using the selected decompression strategy, while leaving the remaining set of data in a compressed state.

6 Claims, 2 Drawing Sheets

(51) Int. Cl.
*G06F 16/174* (2019.01)
*G06F 16/23* (2019.01)

(58) Field of Classification Search
USPC .......... 707/693, 748, E17.005, E17.018,
707/E17.084, 640, 661, 674, 696, 792,
707/999.001, 999.002, 999.003, 999.004,
707/999.005, 999.006, 999.009, 999.1,
707/999.101, 999.102, 999.103, 999.104,
707/999.107
See application file for complete search history.

(56) References Cited

U.S. PATENT DOCUMENTS

| | | | |
|---|---|---|---|
| 6,370,631 | B1 | 4/2002 | Dye |
| 6,614,368 | B1 | 9/2003 | Cooper |
| 7,051,152 | B1 | 5/2006 | Danilak |
| 7,526,607 | B1 | 4/2009 | Singh et al. |
| 2002/0109615 | A1 | 8/2002 | Abdat |
| 2005/0210023 | A1 | 9/2005 | Barrera et al. |
| 2006/0098031 | A1 | 5/2006 | Lai et al. |
| 2010/0121826 | A1 | 5/2010 | Mitsuhashi |
| 2010/0161650 | A1 | 6/2010 | Chaitanya et al. |
| 2010/0228800 | A1* | 9/2010 | Aston ............ G06F 16/1744 707/822 |
| 2010/0281004 | A1 | 11/2010 | Kapoor et al. |
| 2010/0318839 | A1* | 12/2010 | Avila ............ G06F 12/0802 714/5.11 |
| 2010/0328115 | A1 | 12/2010 | Binnig et al. |
| 2011/0270862 | A1 | 11/2011 | Tamiya |
| 2011/0307521 | A1 | 12/2011 | Slezak et al. |
| 2011/0320446 | A1 | 12/2011 | Chakrabarti et al. |
| 2012/0054225 | A1 | 3/2012 | Marwah et al. |
| 2012/0130965 | A1 | 5/2012 | Oh |
| 2012/0209873 | A1 | 8/2012 | He |
| 2012/0246153 | A1 | 9/2012 | Pehle |
| 2012/0323929 | A1 | 12/2012 | Kimura et al. |
| 2012/0330908 | A1 | 12/2012 | Stowe et al. |
| 2013/0103655 | A1 | 4/2013 | Fanghaenel et al. |
| 2013/0238865 | A1 | 9/2013 | Kataoka et al. |
| 2015/0317327 | A1 | 11/2015 | He et al. |

OTHER PUBLICATIONS

Amihood, A. et al.; "Let Sleeping Files Lie: Pattern Matching in Z-Compressed Files"; Journal of Computer and System Sciences 52, 299-307, Article 0023; 1996.
Chen et al. "Query Optimization in Compressed database systems", Newsletter; ACM SIGMOD Record Homepage; vol. 30Issue 2, Jun. 2001 ; pp. 271-282; ACM New York, NY, USA.
Fusco et al; "RasterZip: Compressing Network Monitoring Data with Support for Partial Decompression;" IMC '12 Proceedings of the 2012 ACM conference on Internet measurement conference; Nov. 14-16, 2012; ACM Copyright 2012. pp. 1-14.
List of IBM Patents or Patent Applications Treated as Related.
Niabina, A. et al.; "Dynamic Reconfiguration Optimization with Streaming Data Decompression"; 2010 International Conference on Field Programmable Logic and Applications; IEEE.; 2010.
Tao. Tao; "Pattern Matching in LZW Compressed Files"; IEEE Transactions on Computers, vol. 54, No. 8; August.
Tripney, Brian G. et al. "Data value storage for compressed semi-structured data." H. Decker et al. (Eds.): DEXA 2013, Part 11, LNCS 8056, Springer-Verlag Berlin Heidelberg 2013. pp. 174-188.
Tripney, Brian G. et al. "Data value storage for compressed semi-structured data." H. Decker et al. (Eds.): DEXA2013, Part II, LNCS 8056, Springer-Verlag Berlin Heidelberg 2013. pp. 174-188.
Updated List of IBM Patents or Patent Applications Treated as Related.
USPTO Office Action; U.S. Appl. No. 14/032,122; Notification Date: Feb. 18, 2016.
USPTO Office Action; U.S. Appl. No. 14/032,122; Notification Date: Mar. 2, 2017.
USPTO Office Action; U.S. Appl. No. 14/032,122; Notification Date: Jun. 1, 2016.
USPTO Office Action; U.S. Appl. No. 14/032,122; Notification Date: Sep. 15, 2016.
USPTO Office Action; U.S. Appl. No. 14/307,838; Notification Date: Feb. 18, 2016.
USPTO Office Action; U.S. Appl. No. 14/307,838; Notification Date: Mar. 3, 2017.
USPTO Office Action; U.S. Appl. No. 14/307,838; Notification Date: Jun. 7, 2016.
USPTO Office Action; U.S. Appl. No. 14/307,838; Notification Date: Sep. 15, 2016.
USPTO Office Action; U.S. Appl. No. 14/520,485; Notification Date: Jan. 11, 2017.
USPTO Office Action; U.S. Appl. No. 14/685,947; Notification Date: Jan. 11, 2017.
USPTO Office Action; U.S. Appl. No. 15/604,239; Notification Date: Feb. 20, 2018.
USPTO Office Action; U.S. Appl. No. 15/604,239; Notification Date: Sep. 4, 2018.
USPTO Office Action; U.S. Appl. No. 15/604,239; Notification Date: Feb. 5, 2019.

* cited by examiner

DATA ACCESS PERFORMANCE USING DECOMPRESSION MAPS

BACKGROUND

The present invention relates to database systems, and more specifically, to compression and decompression techniques for use in database systems. Database systems manage large amounts of data, and commonly use data compression as a means to reduce the amount of disk and/or memory storage used to house data objects.

For example, the DB2 database system, which is available from International Business Machines Corporation of Armonk, NY, offers a storage optimization feature, which uses a combination of compression features that transparently compresses data on disk in order to decrease disk space and storage infrastructure requirements. Since disk storage systems can often be the most expensive components of a database solution, even a small reduction in the storage subsystem can result in substantial cost savings for the entire database solution. Some of the data compression techniques used in the DB2 database system include Row Compression, Adaptive Row Compression, and XML Compression.

While the various compression techniques typically provide substantial savings in memory and storage use, they also incur greater use of Central Processing Unit (CPU) resources (i.e. higher CPU use) when accessing the data. Therefore, it would be advantageous to have techniques that reduce the amount of CPU resources that are needed when only a portion of the compressed data needs to be accessed.

SUMMARY

According to one embodiment of the present invention techniques for decompressing data in a database system are provided. A query is received, which pertains to a subset of data within a compressed set of data. One or more decompression strategies are evaluated using a cost model. The cost model includes an estimated filter factor. A low cost decompression strategy is selected based on the results of the evaluation of the one or more decompression strategies. One or more bytes representing the requested subset of data are located within the compressed set of data. Only a portion of the compressed data that corresponds to the subset of data is decompressed, using the selected decompression strategy, while leaving the remaining set of data in a compressed state.

The details of one or more embodiments of the invention are set forth in the accompanying drawings and the description below. Other features and advantages of the invention will be apparent from the description and drawings, and from the claims.

BRIEF DESCRIPTION OF THE SEVERAL VIEWS OF THE DRAWINGS

Like reference symbols in the various drawings indicate like elements.

DETAILED DESCRIPTION

Figure 1:
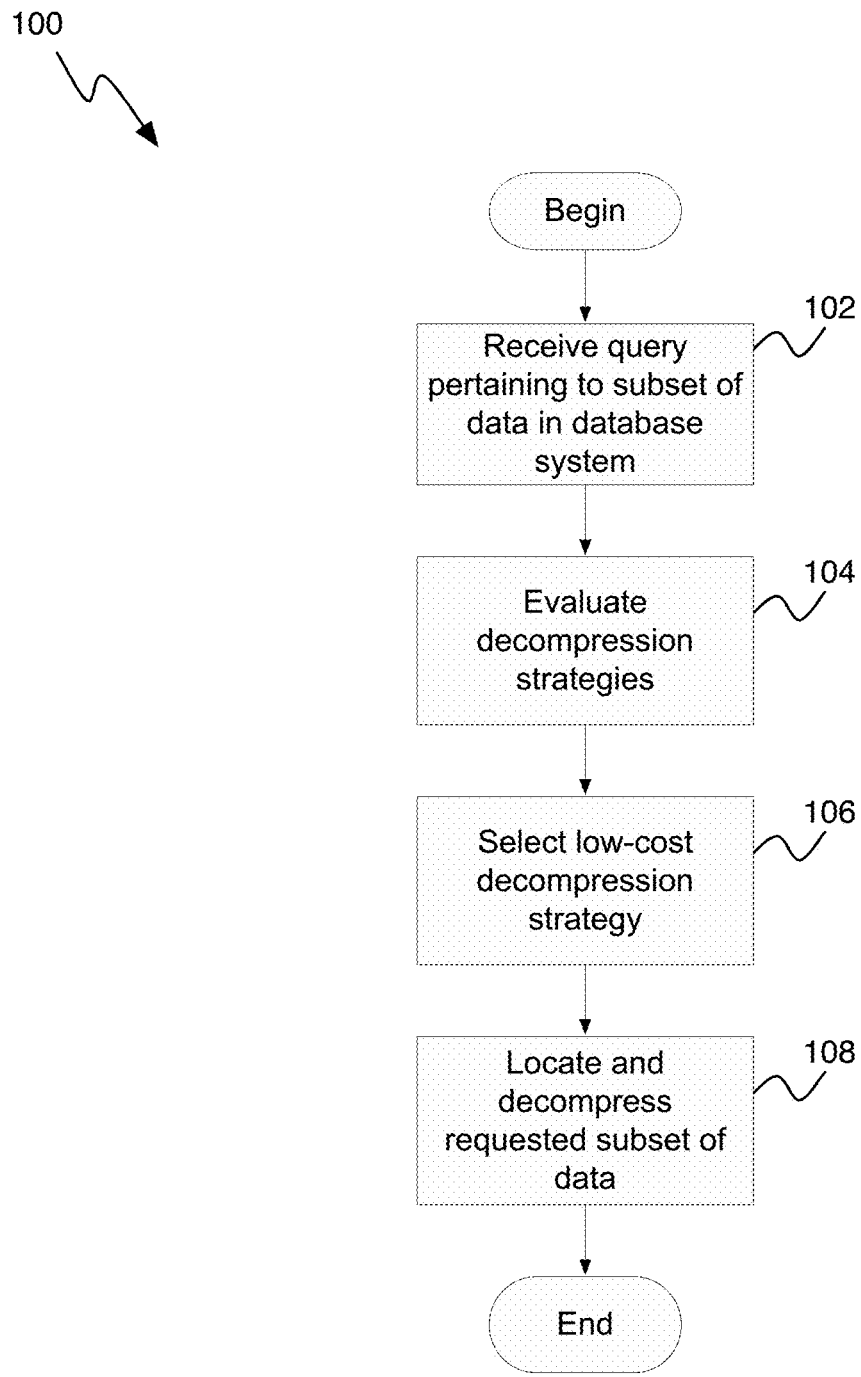
FIG. 1 is a flowchart illustrating a process (100) for decompressing data, in accordance with one embodiment.

As was described above, many database systems, such as the DB2 database system, currently compresses entire rows, and decompresses an entire row when any of the columns in a row need to be accessed. However, when a query runs against a table, it is very common that only a subset of the columns in a row (or a subset of the rows within a page in the table) need to be accessed. The various embodiments described herein greatly improve the performance of queries that need to access only a portion of the row, by providing ways to determine what portion of the decompressed data needs to be expanded in order to provide the data needed for a particular query.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As can be seen in FIG. 1, a process (100) for decompressing data, in accordance with one embodiment, starts by receiving a query pertaining to a subset of data within a compressed set of data (step 102). Typically, in a database system, structures are built that contain information about what columns of a row need to be accessed. For example, in the DB2 database system, there is a structure that details what columns are needed to evaluate the predicates for a particular query, and what columns need to be retrieved and output to the invoker for qualifying rows. In response to receiving the query, the database system interrogates these structures to determine exactly what portions of the row are needed for both the predicate evaluation phase and for the select list processing (the rows that need to be returned for rows that satisfy the predicate). For example, given a table with 20 columns C1 . . . C20, the following query might exist:

SELECT C1, C17
FROM T1
WHERE C1 = 12345;

In this case, the query needs to access column C1 to evaluate the predicate, and when the predicate is true, it needs to access columns C1 and C17. For illustration purposes, it is assumed that each column is 10 bytes long and that the columns are stored in the order C1, C2, C3, . . . C20. In this case, column C1 occupies byte positions 1-10 in the row, and column C17 occupies byte positions C161-C170. Consequently, the code that evaluates the structure determines that only bytes 1-10 of the row are needed to evaluate the predicate for the row. Additionally, for the select list above, both C1 and C17 are needed, but because C1 will have been previously decompressed for the predicate evaluation, only C17 need be decompressed if the row will actually be returned. Thus, for the above query, the following decompression strategy can be used:

Phase 1 decompression (i.e., decompression of the columns needed for predicate evaluation):
Only column C1 (bytes 1-10 of the row) is needed.
Phase 2 decompression (decompression of all remaining columns needed for the select list):
Only column C17 (bytes 161-170 of the row) is needed, because C1 was already done.

As the skilled person realizes, there are multiple ways to ensure that all needed columns are decompressed before they are needed, and the above two-phase example is just one exemplary embodiment. For example, instead of the above approach, phase 1 could just decompress all the bytes for columns C1 and C17. In other embodiments, there could be more phases requiring different portions of the row, that is, maybe if there is group-by processing, the columns needed for the group-by processing could be decompressed as well in an additional phase. Therefore, the process evaluates one or more decompression strategies (step 104). In the embodiment illustrated in FIG. 1, a cost model with an estimated filter factor is used to come up with an optimal (if the filter factor is correct) decompression approach. For example, if it is known that it costs n1 cycles to decompress column C1, that it costs n17 cycles to decompress column C17, and the filter factor of the predicate is 0.25 (i.e. ¼ of all rows satisfy the predicate), then it could be expected that the cost per each decompression would be n1+(n17*0.25) cycles. Similarly, if the CPU time to decompress all columns from C1 to C17 is n1 . . . 17, then if n1 . . . 17 is less than (n1+(n17*0.25)) cycles, then it would make better sense to just decompress the entire row. Thus, by using such a cost model approach in determining the decompression strategy, it is possible to come up with optimal decompression strategies for the row access. Such a cost model is extensible and allows costing of different software and/or hardware methods of decompression for different portions of a row/ strategies, as the skilled person realizes. Based on the evaluation of the compression strategies in step 104, a low cost decompression strategy is selected (step 106). In this context, it should also be noted that while "cycles" is used in this example, it does not have to be actual cycles. Any type of "counts" or "CPU units" that permit a proportionate comparison to be made between two or more decompression approaches can be used for purposes of selecting a "best" decompression strategy.

Finally, the selected decompression strategy is used to actually access the rows and locate the requested bytes of data and decompress them (step 108). In the above example query, the database engine now knows that it needs to access bytes 1 to 10 of the compressed row to evaluate the predicate. Thus, instead of decompressing all 200 bytes of the row, the decompression logic is invoked to just decompress the first 10 bytes and then stop. After this, the predicate can be evaluated. If the predicate evaluates to TRUE, meaning that the select columns need to be returned, the database engine would then attempt to decompress only the bytes needed for column C17 (bytes 161-170). In this case, the decompression algorithm is augmented to handle 'substringing' of the compressed data. To do this, structures are built that determine, for each token of the compressed data, exactly how many bytes are represented by the token. Many database systems, including the DB2 database system, currently uses Lempel-Ziv compression, but as the skilled person realizes, most other compression algorithms can be similarly processed. For example, while the Lempel-Ziv compression uses tokens, other compression algorithms may use other types of units or other logic that is aware of the structure of variable length columns and that can be used to determine the sequence of bytes needed when variable length columns are present.

For example, assuming there is a very small compression dictionary with 8 tokens and each has the following length:

| Token | Length |
|-------|--------|
| 0 | 1 |
| 1 | 1 |
| 2 | 3 |
| 3 | 22 |
| 4 | 99 |
| 5 | 25 |
| 6 | 7 |
| 7 | 2 |
| 8 | 3 |

Assuming further that there is the following sequence of compressed tokens:

2, 7, 1, 1, 4, 3, 6, 0, 3, 8, 5, 7

Using the above token length table, the process can count in to determine what tokens need to be decompressed to get bytes 161-170 of the row. Given the above info, the following can be computed:

| token | Length | Start Pos | End Pos |
|-------|--------|-----------|---------|
| 2 | 3 | 1 | 3 |
| 7 | 2 | 4 | 5 |
| 1 | 1 | 6 | 6 |
| 1 | 1 | 7 | 7 |
| 4 | 99 | 8 | 106 |
| 3 | 22 | 107 | 128 |
| 6 | 7 | 129 | 135 |
| 0 | 1 | 136 | 136 |
| 3 | 22 | 137 | 158 |
| 8 | 3 | 159 | 161 |
| 5 | 25 | 162 | 186 |
| 7 | 2 | 187 | 188 |

Thus, when "counting" in to the compressed string, it would be clear that the 10th compressed token, '8,' is 3 bytes in length, and covers bytes 159 to 161 of the row. The first byte needed for the select list is byte 161, so the decompressing would start with token 10. The decompressing would then continue until byte 170 of the row had been decompressed, which would happen with the following token, i.e., token '5.' Thus by decompressing only tokens 8 and 5 (or alternately just the needed portion of the tokens needed), all the data for accessing C17 of the row is now available. Typically, the cost of 'counting' to the appropriate offsets is much lower than actually decompressing the bytes. It is thus much faster to decompress only the portions of the row that are needed.

It should be noted that the process (100) described above is merely one example process and that there may be many variations that are apparent to those having ordinary skill in the art.

For example, using the cost model approach described above, it is possible to make decisions that optimally use any decompression strategies. For example, if only columns C1 and C3 need to be decompressed for a query, a cost estimation could be made comparing the costs of decompressing only columns C1 and C3, versus decompressing columns C1, C2, and C3. Even though column C2 is not needed, it is possible that decompressing the entire contiguous range is faster than decompressing columns C1 and C3 separately and counting in between them. Similarly, if only column C3 is needed, it is possible that decompressing columns C1 . . . C3 is faster than just decompressing column C3 alone because column C1 starts at the beginning of the row. Thus, the cost model ensures that any variety of substring decompression approaches can be compared so the lowest cost alternative is chosen.

It should further be noted that it is possible that some of the columns needed may be variable in length, and some may be at variable offsets within the row. In these cases simple byte offsets may be insufficient. The length of variable length columns may be stored in many different ways. For example, DB2 uses two different approaches to store variable length items. In one approach, any variable length column is preceded by its length. In the other approach, a map is stored with the row to give the offsets to the start of every variable length column. These are merely two examples, though. The main point is that there is logic that causes the decompressor to be aware of the structure of the variable length columns and to determine the sequences of bytes needed when variable length columns are present. It does not matter whether the offsets are stored in the middle of a row, or if they are at the start, or if there are simply length preceding the varchars. The decompression maps can be built to provide for many different structures, and the essential point is that in any of these approaches, it is possible to determine the actual bytes that are needed for a variable length column instance.

For example, assume the database system stores the offsets to the beginnings of every varchar, something that is often referred to as a "reordered row format." Below is shown an exemplary row structure, such as a structure of a row in the DB2 database system. In this case, every variable length column has its beginning offset stored at a fixed position within the row. Assume a table exists with columns C1, VC2 VC3 where C1 is a fixed length character column of length 10, and VC2 and VC3 are variable length character fields with a maximum length of 100 bytes. In this case, a row would look like the following:

| 210 bytes | 2 bytes | 2 bytes | Ofs(Vc3)-(Ofs(VC2) bytes | row len - Ofs(VC3) bytes |
|-----------|---------|---------|--------------------------|--------------------------|
| row len C1 Value | Ofs(VC2) | Ofs(VC3) | VC2 Value | VC3 Value |

If a query wanted to access only column VC3 then substring decompression can be used to get just the starting offset of VC3 (stored in the compressed data as Ofs(VC3). Then the decompression will continue 'counting' until the beginning of VC3 is encountered and continue decompressing until the end of the column is encountered (in this case, for the last column, decompressing could be done until the end of the compressed data). Since the substring decompression is capable of quickly switch between counting and decompressing, it is possible to quickly decompress the desired offsets within the row, and then use those to specify a later decompression byte range. In the DB2 database system's current implementation, for example, the positions of the bytes needed to decompress are given with a zero-terminated array of addresses. For example, a row is decompressed into a work area at address WAPtr, and it is desirable to decompress bytes from 161 to 170 of the row, an array can be built as follows:

| |
|---|
| WAPtr + 160 |
| WAPtr + 169 |
| 0 |

Such an array is referred to as a decompression map, as the array indicates what portions of the row need to be decompressed While it is also possible to just have the decompression map store the offsets instead of the addresses in some embodiments, the above approach with addresses into a buffer may be more efficient for certain database system implementations. If it is desirable instead to access a variable length entry whose starting position is stored within the compressed data at offset 14 (as it is for Ofs(VC3) above), a decompression map can be built as follows:

| | |
|---|---|
| WAPtr + 14 | Indirect + 1 |
| to be filled in | start decomp |
| WAPtr + maxRowLen | end decomp |
| 0 | |

In this case, the first offset is marked with a field that indicates that the two-byte field at this offset should be added to WAPtr and stored at the next entry in the decompression map. Thus, the next entry in the decompression map is filled in with the offset at which decompressing should start. Because VC3 is the last column of the row, the 'ending' decompression offset is just set to the maximum row length and the decompression will just terminate when all compressed data has been processed. If there were other variable length columns following VC3 then their offsets could be used with similar indirection operator to indicate the ending position of the compressed row. It should be noted that in some cases it may be faster to decompress the entire variable length portion of the row, and a cost estimate for this alternative may therefore also be calculated. For example, if an implementation always stores all variable length columns at the end of the row, then the tail end of the row alone could be decompressed without any 'indirection' in the decompression map.

In the event that variable length columns are preceded by their length, it is possible to have an indirection approach that uses that length to adjust later decompression positions. For example, if the third variable length column was requested, an indirection approach could be used where a value is added at a particular offset to a later decompression map entry, thus taking into account the length of preceding variable length entries. As the skilled person realizes, such an indirection approach is suitable for many different formats of variable length columns.

Further, it should be noted that in some embodiments it is also possible for the decompression map to store multiple byte ranges. For example, if there were a query that always retrieved columns C1 and C17 from the example above but without the predicate, a decompression map could be built as follows:

| | |
|---|---|
| WAPtr + 0 | start decomp |
| WAPtr + 9 | stop decomp |
| WAPtr + 160 | start decomp |
| WAPtr + 169 | stop decomp |
| 0 | end of decomp map |

In this way, multiple discontiguous portions of a row can be decompressed without having to decompress the entire row.

It should be note that while the description above has often used the DB2 database system, by way of example, the techniques described above are of course applicable to many other paradigms. For example, it is possible that compressed network streams need to access only small portions of data streams (i.e., headers or trailers) at predictable offsets. In this case, it is possible to count and decompress only the portions of the stream that need to be examined. Thus, there is a large number of areas in which the general techniques described above can be applied.

It should further be noted that while the above examples have been focused on decompression of data that starts at the beginning of a row and counts tokens or units towards the end of the row to identify the proper bytes to be decompressed, similar techniques can be applied in reverse. That is, the decompression can start from the end of a row, rather than from the beginning of a row. This may be particularly useful, for example, in a situation where, say, a row is 200 bytes long and it is known that only the last 20 bytes are needed. In such a situation, the decompression can start from the end of the row, thus avoiding the need to count tokens or units to identify which bytes need to be decompressed, and thereby making the decompression even more efficient. Many variations and/or combinations of these techniques can be envisioned by those of ordinary skill in the art.

Figure 2:
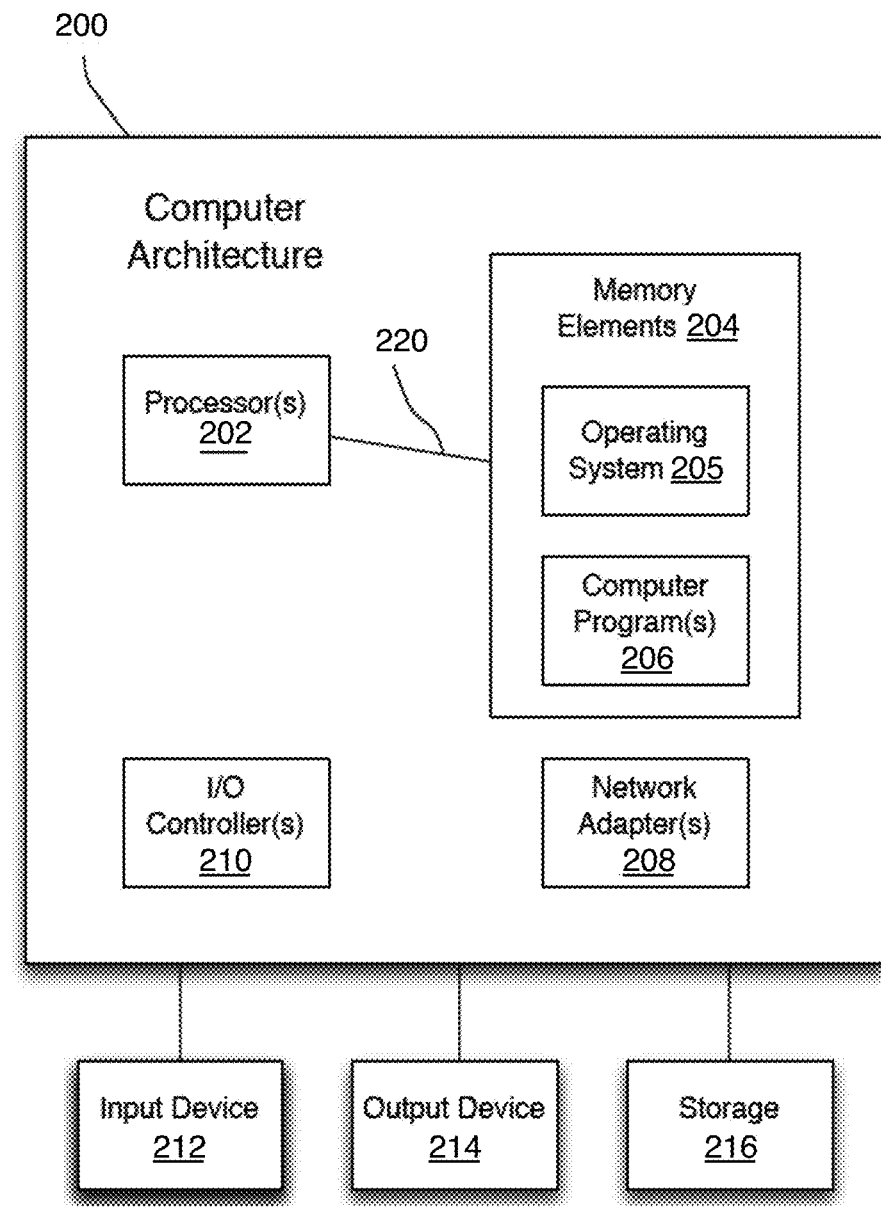
FIG. 2 illustrates a computer architecture (200) that may be used in accordance with one embodiment.

FIG. 2 shows a schematic view of a computer architecture (200) that may be used in accordance with certain embodiments. In certain embodiments, the computing device may implement the computer architecture (200). The computer architecture (200) is suitable for storing and/or executing program code and includes at least one processor (202) coupled directly or indirectly to memory elements (204) through a system bus (220). The memory elements (204) may include local memory employed during actual execution of the program code, bulk storage, and cache memories which provide temporary storage of at least some program code in order to reduce the number of times code must be retrieved from bulk storage during execution. The memory elements (204) include an operating system (205) and one or more computer programs (206).

Input/Output (I/O) devices (512, 514) (including but not limited to keyboards, displays, pointing devices, etc.) may be coupled to the system either directly or through intervening I/O controllers (510).

Network adapters (508) may also be coupled to the system to enable the data processing system to become coupled to other data processing systems or remote printers or storage devices through intervening private or public networks. Modems, cable modem and Ethernet cards are just a few of the currently available types of network adapters (508).

The computer architecture (500) may be coupled to a storage device (516) (e.g., any type of storage device; a non-volatile storage area, such as magnetic disk drives, optical disk drives, a tape drive, etc.). The storage device (516) may comprise an internal storage device or an attached or network accessible storage. Computer programs (506) in the storage device (516) may be loaded into the memory elements (504) and executed by a processor (502) in a manner known in the art.

The computer architecture (500) may include fewer components than illustrated, additional components not illustrated herein, or some combination of the components illustrated and additional components. The computer architecture (500) may include any computing device known in the art, such as a mainframe, server, personal computer, workstation, laptop, handheld computer, telephony device, network appliance, virtualization device, storage controller, etc.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the invention, the embodiments reside in the claims hereinafter appended or any subsequently-filed claims, and their equivalents.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention claimed is:

1. A computer program product for decompressing data in a database system, the computer program product comprising a non-transitory computer readable storage medium having program code embodied therewith, the program code being executable by a processor to:

receive, by the processor, a query pertaining to a subset of data within a compressed set of data;

evaluate, by the processor, one or more decompression strategies by calculating a number of cycles needed for decompressing only a subset of columns within a row and comparing the calculated number of cycles with a number of cycles needed for decompressing all columns within the row, and applying an estimated filter factor to the calculated numbers;

select, by the processor, a low cost decompression strategy based on the results of the evaluation of the one or more decompression strategies;

locate, by the processor and by using a decompression map for each row, one or more bytes representing the requested subset of data within the compressed set of data, wherein the decompression map is stored as an array and describes the bytes representing a variable length column instance within the row, and wherein the subset of data includes one of: a subset of columns within a row of a database table, a subset of bytes within a row of the database table, and a subset of rows within a page of the database table; and decompress, by the processor, only a portion of the compressed data that corresponds to the subset of data, using the selected decompression strategy, while leaving the remaining set of data in a compressed state.

2. The computer program product of claim 1, wherein the decompression strategy includes two or more decompression phases, and wherein a first decompression phase includes decompression of the columns needed for predicate evaluation and a second decompression phase includes decompression of all remaining columns needed for a select list.

3. The computer program product of claim 1, wherein locating one or more bytes representing the requested subset of data within the compressed set of data includes:

determining, by the processor, a unit representing a certain number of bytes of compressed data; and determining, by the processor, what units need to be decompressed to get to the one or more bytes representing the requested subset of data within the compressed set of data.

4. The computer program product of claim 3, wherein every variable length column is preceded by a number describing the length of the variable length column.

5. The computer program product of claim 1, wherein decompressing starts at the beginning of a row.

6. The computer program product of claim 1, wherein decompressing starts at the end of a row.

* * * * *